H. PARKS.
Straw Cutter.
No. 70,891.
Patented Nov. 12, 1867.
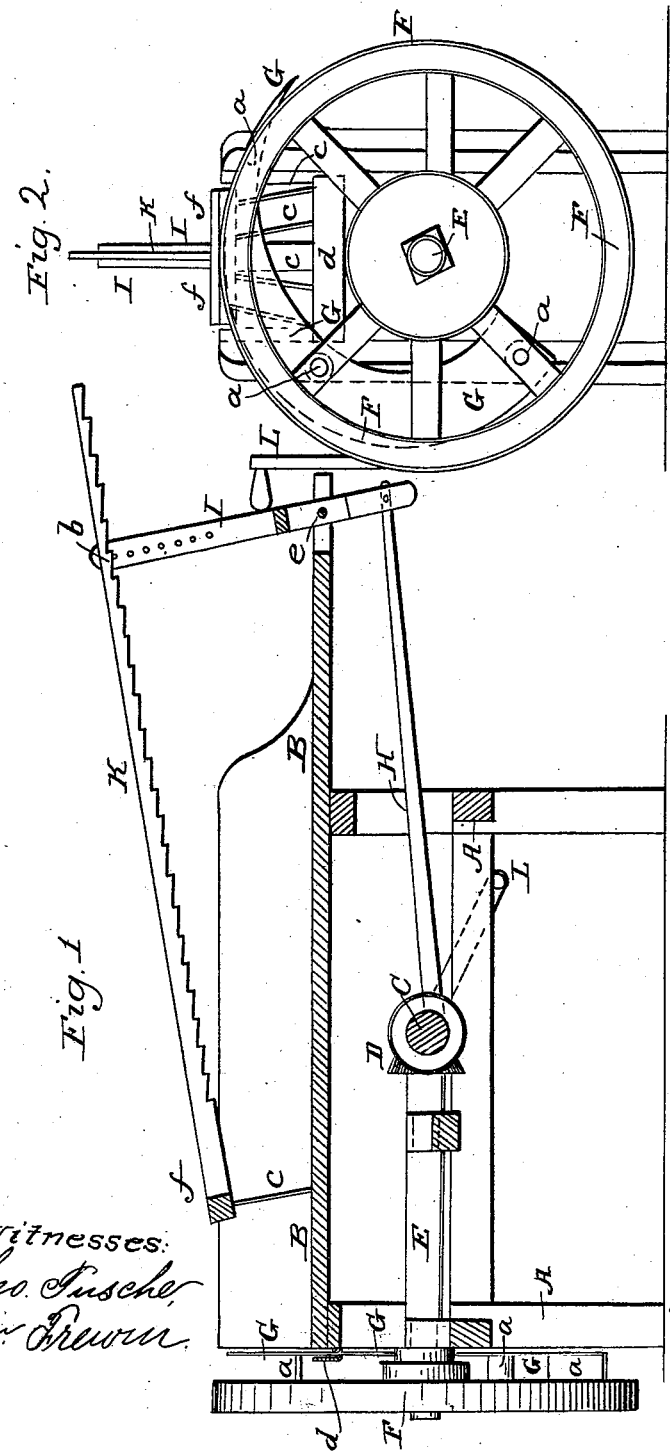

United States Patent Office.

HIRAM PARKS, OF ATHENS, NEW YORK.

Letters Patent No. 70,891, dated November 12, 1867.

---

STRAW-CUTTER.

---

*The Schedule referred to in these Letters Patent and making part of the same.*

---

TO ALL WHOM IT MAY CONCERN:

Be it known that I, HIRAM PARKS, of Athens, in the county of Greene, and State of New York, have invented a new and improved Straw-Cutter; and I do hereby declare that the following is a full, clear, and exact description thereof, which will enable others skilled in the art to make and use the same, reference being had to the accompanying drawings, forming part of this specification, in which—

Figure 1 is a vertical longitudinal section of my improved straw-cutter.

Figure 2 is a front elevation of the same.

Similar letters of reference indicate like parts.

This invention relates to a straw-cutter, in which a curved knife is used, and is secured to a revolving shaft, so as to make a drawing cut, and so as to cut a whole bundle of straw with the same facility with which the usual machines cut a small quantity. A ratchet-bar is used for a feed-bar, and is provided with teeth similar to a rake at its front end, and rests with the rear end upon a pin which is secured to an oscillating vertical lever. When the upper end of this lever moves forward, it carries the feed-bar along, while, when it moves back, it does not affect the motion of the bar.

A represents the frame and B the box of a straw-cutter, which are both made in the usual manner. C is the horizontal driving-shaft arranged transversely below the box B, and mounted in suitable bearings that are arranged in the frame A. By means of bevel-gearing D, motion is conveyed from the shaft C to a horizontal shaft, E, which extends to the front of the machine, and is mounted in bearings that are arranged in the frame A, as shown. On the front end of this shaft is mounted a fly-wheel, F, and to the spokes of the latter are secured horizontal pins $a$ projecting toward the box B. To these pins is secured a curvilinear knife, G, which is so arranged as to sweep close in front of the box B. The shape of this knife is such that the inner or cutting edge of the same forms an eccentric curve partly around the shaft E. The point of the knife is farthest from the shaft, and is so arranged that it will be drawn through the straw even if the same should fill the box B to the top. The drawing cut obtained by this form of revolving knife is greatly superior to that which is obtained by the drop-knives now generally used. It is obvious that, if desired, two or more such curvilinear cutters may be arranged on one machine around the shaft E. A metal plate, $d$, is arranged outside of the knife, and in front of the box B, to facilitate the cutting, and to prevent the straw from being bent down by the cutter instead of being cut. To a crank on the driving-shaft C, or otherwise eccentric to the latter, is pivoted a lever, H, that extends back, and the rear end of which is connected to the lower end of a vertical lever, I, as shown in fig. 1. The latter is pivoted to the rear of the box B, and is by the motion of the shaft C oscillated around its axis $e$. The upper end of this lever may be bifurcated so as to hold a horizontal pin, $b$, upon which the notched feed-bar K rests, as shown. The front end of this bar is provided with a cross-head, $f$, on which teeth or fingers $c$ are secured, which are put into the straw, and then as soon as the upper end of the lever I swings toward the front the bar K will be pushed ahead, as then the pin $b$ strikes against the vertical faces of the notches on the said bar K, and thus the straw will be fed forward. When the upper end of the lever I swings back, the pin $b$ will move below the inclined faces of the bar K, and will not affect the position of the latter. A crank, L, on the shaft C, is used to set the machine in motion. The lever I is perforated with a series of holes, so that the pin $b$ may be set higher or lower, whereby the feed may be regulated.

What I claim as new, and desire to secure by Letters Patent, is—

The notched feed-bar K, when provided at its front with teeth, in combination with the pin $b$ on the oscillating lever I, all made and operating substantially as herein shown and described.

HIRAM PARKS.

Witnesses:
 HOWARD C. SMITH,
 N. P. VAN LOAN.